United States Patent [19]
Carobolante et al.

[11] Patent Number: 5,285,135
[45] Date of Patent: Feb. 8, 1994

[54] AUTOMATIC ADJUSTMENT OF COMMUTATION DELAY FOR BRUSHLESS DC MOTOR FOR IMPROVED EFFICIENCY

[75] Inventors: Francesco Carobolante, San Jose, Calif.; Ermanno Pace, Phoenix; Mark E. Rohrbaugh, Scottsdale, both of Ariz.

[73] Assignee: SGS-Thomson Microelectronics, Inc., Carrollton, Tex.

[21] Appl. No.: 949,732

[22] Filed: Sep. 23, 1992

[51] Int. Cl.⁵ .............................................. H02P 6/02
[52] U.S. Cl. ..................................... 318/254; 318/138
[58] Field of Search ............... 318/138, 254, 439, 445, 318/452

[56] References Cited

U.S. PATENT DOCUMENTS

| | | |
|---|---|---|
| 3,612,974 | 10/1971 | Wolf . |
| 3,863,118 | 1/1975 | Lander et al. ........................ 318/685 |
| 4,400,654 | 8/1983 | Elliott . |
| 4,525,657 | 6/1985 | Nakase et al. ....................... 318/254 |
| 4,720,663 | 1/1988 | Welch et al. ..................... 318/254 X |
| 4,874,993 | 10/1989 | Tanaka et al. ...................... 318/254 |
| 4,879,498 | 11/1989 | Shinohara et al. .................. 318/254 |
| 4,897,583 | 1/1990 | Rees .................................. 318/254 |
| 5,053,688 | 10/1991 | Rees .................................. 318/599 |
| 5,157,311 | 10/1992 | Hara et al. .......................... 318/254 |

*Primary Examiner*—Bentsu Ro
*Attorney, Agent, or Firm*—Richard A. Bachand; Lisa K. Jorgenson; Richard K. Robinson

[57] ABSTRACT

A circuit and method are provided for automatically adjusting a commutation delay from events indicating a position of a polyphase dc motor. The circuit includes a driver to supply drive current to selected stator coils of said motor. A sequencer is connected to control the driver to apply drive current to selected motor coils to rotate the motor. Motor position detecting circuitry is connected to detect the events indicating the position of the motor. A commutation delay circuit is connected to increment the sequencer in response to the detection of the events indicating the position of the motor detected by the motor position detecting circuitry. A circuit for adjusting the delay of said commutation delay circuit between each event and each sequencer commutation provides optimum motor commutation for maximum power efficiency.

According to the method, drive current is supplied to selected stator coils of said motor in predetermined commutated sequences to rotate the motor. Events are detected indicating the position of the motor, and the delay between each position indicating event and each commutation sequence is automatically adjusted to provide optimum motor commutation for maximum power efficiency.

17 Claims, 1 Drawing Sheet

AUTOMATIC ADJUSTMENT OF COMMUTATION DELAY FOR BRUSHLESS DC MOTOR FOR IMPROVED EFFICIENCY

BACKGROUND OF THE INVENTION

1. Field of the Invention

This invention relates to improvements in electronic circuitry of the type used with polyphase dc motors, and, more particularly, to improvements in commutation delay circuits for use with such motors, and, still more particularly, to an improved circuit and method for automatically establishing the commutation delay for producing optimum motor efficiency.

2. Technical Background

In the operation of polyphase dc motors, typically a delay is provided between the occurrence of a motor position indicating event and the commutation of the motor to a next coil energization sequence. The position indicating event can be, for example, a pulse produced on a Hall-effect sensor, a back emf zero crossing in a floating coil, or other event.

Although the theoretical commutation time from the position indicating event generally can be accurately calculated, other factors such as delays in the circuit, motor rotation inhibiting friction, and the like, can result in the actual optimum commutation time being different from that theoretically calculated. As the delay is changed from the optimum value, the amount of current that is provided to the motor to sustain its rotation at a particular speed increases. Also, at the optimum commutation point, the maximum torque of the motor is developed for a minimum amount of current (or energy) delivered to it.

Other factors that affect the delay are non-linearities in the drive circuit at various drive currents. For example, at a first current that maintains a first motor speed, the delay may be different from a second drive current that maintains a second rotational speed. In addition, variations among motors themselves due to the particular coil configurations and other manufacturing differences, produce different optimum commutation delay periods from motor to motor.

In a typical three-phase dc motor, it has been found, for example, that an optimum commutation delay is 30 electrical degrees from a zero crossing of the back emf of a floating coil of the motor. Still, it has been found that typical motor driver delays for such motors are roughly 20 to 22 electrical degrees to result in the 30 degree commutation delay seen at the coils of the motor.

It should be noted that changes in the energy consumption that result from small differences in commutation delay, of say, for example, between 22 and 28 degrees, does not result in a particularly large energy savings. But, considering the increasingly strict demands for energy efficiency, particularly, in laptop computers that rely on rechargeable batteries, or similar environments, even small improvements are increasingly desirable.

In the past, the commutation delay has been typically established by an R-C circuit that is charged from a first zero crossing of the back emf of a floating coil. Then, after a second zero crossing, the capacitor is discharged at twice the rate. When the capacitor becomes discharged, the midpoint of the zero crossings will have been reached. Thus, the commutation may be initiated at that point. Adjustment of the precise commutation time can, therefore, be manually adjusted by varying the discharge time of the capacitor.

SUMMARY OF THE INVENTION

Considering the above, it is, therefore, an object of the invention to provide an improved commutation delay circuit for a polyphase dc motor.

It is another object of the invention to provide a commutation delay circuit of the type described that automatically adjusts the delay for optimum motor efficiency.

It is another object of the invention to provide a commutation delay circuit of the type described in which the delay automatically compensates for fixed and variable efficiency changing factors, such as frictional losses, aging properties of the components, and the like.

It is another object of the invention to provide a method for operating a polyphase dc motor at optimum efficiency.

It is still another object of the invention to provide an improved method of the type described for automatically adjusting the commutation delay of a polyphase dc motor.

It is yet another object of the invention to provide a method and circuit for minimizing the torque ripple in the operation of a polyphase dc motor.

It is still yet another object of the invention to provide a method and circuit to operate a polyphase dc motor with many different loads, without needing to manually adjust the commutation delay.

These and other objects, features, and advantages will become apparent to those skilled in the art from the following detailed description when read with the accompanying drawings and appended claims.

According to a broad aspect of the invention, a circuit is provided for automatically adjusting a commutation delay from events indicating a position of a polyphase dc motor. The circuit includes a driver to supply drive current to selected stator coils of said motor. A sequencer is connected to control the driver to apply drive current to selected motor coils to rotate the motor. Motor position detecting circuitry is connected to detect the events indicating the position of the motor. A commutation delay circuit is connected to increment the sequencer in response to the detection of the events indicating the position of the motor detected by the motor position detecting circuitry. A circuit for adjusting the delay of said commutation delay circuit between each event and each sequencer commutation provides optimum motor commutation for maximum power efficiency.

According to another broad aspect of the invention, a method for automatically adjusting a commutation delay from events indicating a position of a polyphase dc motor is presented. The method includes supplying drive current to selected stator coils of said motor in predetermined commutated sequences to rotate the motor, detecting events indicating the position of the motor, and automatically adjusting a delay between each position indicating event and each commutation sequence to provide optimum motor commutation for maximum power efficiency.

BRIEF DESCRIPTION OF THE DRAWINGS

A preferred embodiment of the invention is shown in the accompanying drawing, in which.

DETAILED DESCRIPTION OF A PREFERRED EMBODIMENT

Figure 1:
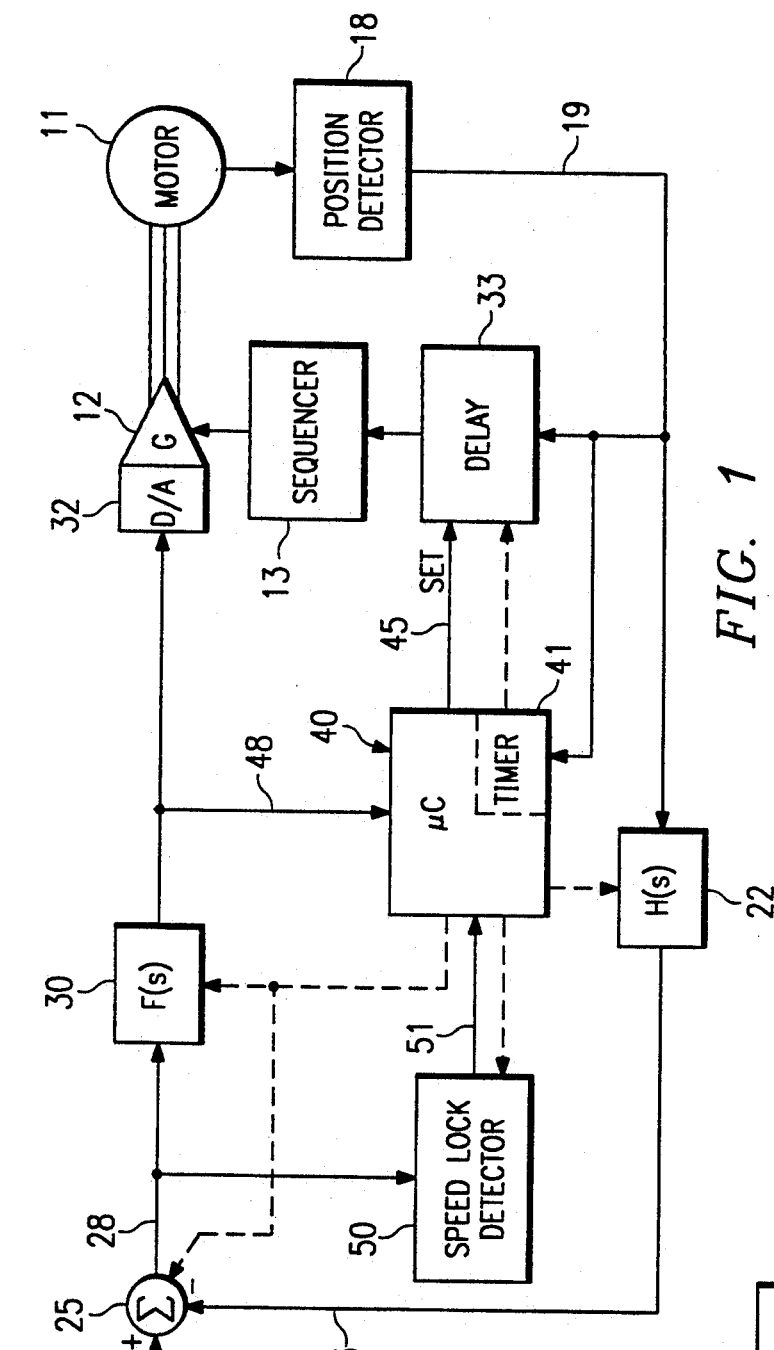
FIG. 1 is an electrical box diagram illustrating a circuit in which the automatic commutation technique of the invention may be practiced.

With reference now to FIG. 1, a box diagram is shown illustrating a circuit 10 for controlling the operation of a motor 11. The motor 11 can be of a polyphase brushless, sensorless, dc motor that is operated by providing switched dc drive signals to various combinations of its stator coils. Such motors are well known in the art, and are not described in detail. The dc drive signals are produced by a transconductance circuit 12 that may include a plurality of drive transistors that are sequentially switched or commutated according to signals from a sequencer circuit 13. The signals from the sequencer circuit 13 to the transconductance circuit 12 produce the transistor switching necessary to deliver the necessary drive signals to the motor 11 to produce its rotation.

Typically a signal representing the position of the rotor of the motor 11 is developed in a position detector circuit 18 and fed back for comparison to a reference signal produced by a reference signal generator 20. The position indicating signal detected by the position detection circuit 18 can be produced, for example, by a physical motor position indicator, such as a Hall-effect sensor, or the like, but, preferably, is a signal that is derived from the so called "zero crossing" voltages of the floating coils of the motor 11. The position detection signal produced on the output of the position detection circuit 18 on line 19, therefore, typically is a series of pulses having a period equal to the period between position indicating events, such as the zero crossings of the back emf voltage.

If desired, the signal on the line 19 from the position detector 18 can be modified by a function H(s) in a feedback circuit 22 that has a transfer function producing the desired modification signal. The output from the feedback circuit 22 on line 23 is delivered to a signal summer 25 to be subtracted from the reference speed signal from the reference signal generator 20 also delivered to the summer 25. Thus, an error signal is developed on line 28 representing the difference between the signal produced by the position detector 18 and the reference speed signal from the reference signal generator 20.

It will be appreciated that in some applications the frequencies of the respective reference speed signal and position indicating signal can be compared, and, in other applications, the phase difference between the two signals can be developed.

The error signal on the line 28 is modified, if desired, by a forward transfer function F(s) by circuitry 30 for application to the transconductance circuitry 12. Typically the transfer function of the circuitry 30 is an integrating function so that the output from the circuitry 30 represents a cumulative error to provide the correct operating speed parameter or correction thereto to the transconductance circuitry 12.

If desired, the entire system can be digitally implemented. In such case, a digital to analog converter 32 can be provided to which the output signals from the circuitry 30 are applied for application to the transconductance circuitry 12.

A delay circuit 33 receives the position indicating signals from the line 19, and determines the time the sequencer 13 is incremented to commutate the transistors or switches within the transconductance circuitry 12 to the next motor driving state. In the past, the delay provided by the delay circuit was ordinarily fixed or constant. Typically, for example, a delay of approximately 20 electrical degrees was selected as a compromise delay for efficient motor operation.

According to the invention, however, the delay provided by the delay circuitry 33 is automatically adjusted. For this purpose, a microcontroller 40 is provided. The controller 40 is configured such that when the motor 11 first reaches operating speed after startup, or again reaches operating speed after experiencing a speed perturbation or interruption, the delay is varied to produce a minimum drive current to the motor 11. After that, the delay that is established is maintained during operation. Thus, the delay adjustment need be made only once, when the motor first reaches operating speed, or, if desired, if an event occurs that causes the motor loop 10 to lose lock, when the lock condition is re-established.

The microcontroller 40 is of the type that includes a timer circuit 41. In the embodiment illustrated, the position detection signal on the line 21 is connected to the timer 41 to provide information to the microcontroller concerning the period of the signal indicating the motor position. With this information, with the information derived from the magnitude of the current supplied to the motor, the microcontroller 40 determines the optimum delay that is set into the delay circuitry 33 on a line 45. Besides the calculation of the delay, the provision of the timer 41 in the microcontroller 40 enables the microcontroller 40 to perform the other calculations necessary, for example, by the feedback transfer function circuitry 22 and the forward transfer function circuitry 30.

It will be appreciated that many functions of the circuit 10 can be functionally performed by the microcontroller 40. Thus, for example, the transfer functions of the circuits 22 and 30 can be performed within the microcontroller, also the digital summation and production of the error signal by the summer 25 onto the line 28. Other functions easily can be performed in whole or in part by the microcontroller 40.

Figure 2:
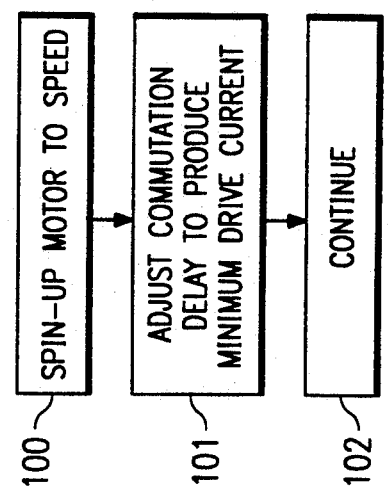
FIG. 2 is a box diagram showing the steps of performing a method according to the invention.

Thus, with reference now also to FIG. 2, the operation of the circuit to find automatically the optimum commutation delay of the motor is described. The motor is first spun-up to speed 100. The microcontroller 40 receives a digital signal on line 48 that represents the magnitude of the drive current provided to the motor 11 by the transconductance circuitry 12. The microcontroller 40 varies the delay produced by the delay circuit 33 by setting various delay values into the delay circuitry 33 on the line 45. The microcontroller 40 then determines 101 the delay that produced the minimum magnitude of drive signal (in a preferred embodiment, a digital signal) and presets that value into the delay circuitry 33 for subsequent motor driving operation 102.

As mentioned, the optimization technique need be performed only once after lock is obtained within the loop between the motor 11 and summer 2. Thus, a circuit (not shown) can be provided to indicate The speed lock can be determined, for example, by a speed lock detection circuit 50 that determines several cycles, for example ten cycles, that the motor speed signal matches the reference speed signal. Upon finding that the motor is at speed, a signal can be provided on line 51 to the microcontroller 40 to initiate the delay optimization determination technique.

It also should be noted that algorithms are well known to find minimum values of one parameter with respect to another. Such algorithm can be easily adapted for use in the operation of the microcontroller 40 to find a particular optimum delay to produce minimum drive signal to the transconductance circuitry 12.

It will be appreciated by those skilled in the art that the method and circuit described will be of advantage of operating the motor 11 at optimum delay with minimum torque ripple is minimized. This is important, particularly in computer disk drive applications in realizing reduced noise of the disk drive motors.

In addition, it will be appreciated that the method and circuit of the invention can operate the motor and its control system with many different loads, without manually needing to adjust the commutation delay.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A circuit for automatically adjusting a commutation delay from events indicating a position of a polyphase dc motor, comprising:
   a driver to supply drive current to selected stator coils of said motor;
   a sequencer connected to control the driver to apply drive current to the selected motor coils to rotate the motor;
   motor position detecting circuitry connected to detect the events indicating the position of the motor;
   a commutation delay circuit connected to increment the sequencer in response to the detection of the events indicating the position of the motor detected by the motor position detecting circuitry;
   a circuit for adjusting the delay of said commutation delay circuit between each event and each sequencer commutation to provide optimum motor commutation for maximum power efficiency, said circuit for adjusting the delay of said commutation delay circuit comprising a feedback circuit between said motor position detecting circuitry and said driver, said feedback circuit providing a transfer function of H(s) to provide a desired modification signal for adjusting said delay.

2. The circuit of claim 1 wherein said motor position detecting circuitry comprises Hall-effect sensors.

3. The circuit of claim 1 wherein said position indicating event is a zero voltage crossing of the back emf of a floating motor coil.

4. The circuit of claim 1 wherein said circuit for adjusting the delay of said commutation delay circuit comprises a circuit for adjusting the delay to obtain minimum motor drive current from said driver.

5. A motor driver circuit for providing drive signals to a polyphase dc motor, comprising:
   a transconductance circuit to supply drive current to selected stator coils of said motor;
   a sequencer connected to control the transconductance circuit to apply said drive current to said selected stator coils to rotate the motor;
   motor position detecting circuitry connected to detect events indicating the position of the motor and to output a signal indicative thereof;
   a commutation delay circuit connected to increment the sequencer in response to the detection of the events indicating the position of the motor detected by the motor position detecting circuitry;
   a reference signal generator to produce an output reference speed signal having a parameter corresponding to a desired motor operating speed;
   a summer connected to receive the motor position indicating signal and said output reference speed signal of said reference signal generator to produce an error difference signal output;
   said error difference signal output being applied to said transconductance circuit to control the drive current provided by said transconductance circuit to said motor;
   a circuit for automatically adjusting the delay of said commutation delay circuit between each event and each sequencer commutation to provide optimum motor commutation for minimum drive current from said transconductance circuit;
   and a feedback circuit between said summer and said motor position detecting circuitry having a transfer function of H(s) to provide a signal to said summer that can be subtracted from said reference speed signal.

6. The motor driver circuit of claim 5 wherein at least said commutation delay circuit, said summer, said circuit for automatically adjusting the delay of said commutation delay circuit are digitally implemented circuits, and further comprising a microcontroller programmed to provide a digital implementation of said commutation delay circuit, said summer, and said circuit for automatically adjusting the delay of said commutation delay circuit.

7. The motor driver circuit of claim 5 wherein said motor position detecting circuitry comprises Hall-effect sensors.

8. The motor driver circuit of claim 5 further comprising a circuit between said summer and said transconductance circuit to having a transfer function of F(s).

9. The motor driver circuit of claim 8 wherein said transfer function F(s) is an integration function.

10. The motor driver circuit of claim 9 wherein at least said commutation delay circuit, said summer, said circuit for automatically adjusting the delay of said commutation delay circuit, and circuits having transfer functions H(s) and F(s), are digitally implemented circuits, and further comprising a microcontroller programmed to provide a digital implementation of said commutation delay circuit, said summer, said circuit for automatically adjusting the delay of said commutation delay circuit, and said circuits having transfer functions H(s) and F(s).

11. The motor driver circuit of claim 5 wherein said motor position detecting circuitry comprises circuitry for detecting a zero voltage crossing of the back emf of a floating motor coil.

12. A method for automatically adjusting a commutation delay from events indicating a position of a polyphase dc motor, comprising the steps of:
   supplying drive current to selected stator coils of said motor in predetermined commutated sequences to rotate the motor;
   detecting events indicating the position of the motor;

automatically adjusting a delay between each position indicating event and each commutation sequence to provide optimum motor commutation for maximum power efficiency;

providing a reference signal;

generating a motor position indicating signal from said detected events indicating the position of the motor;

determining a difference between said reference signal and said position indicating signal;

modifying the motor position indicating signal by a transfer function of H(s) to provide a signal for determination of said difference;

and adjusting the drive current to the motor to minimize the difference.

13. The method of claim 12 wherein said step of detecting events indicating the position of the motor comprises the step of detecting zero voltage crossings of the back emf of floating motor coils.

14. The method of claim 12 wherein said step of automatically adjusting a delay between each position indicating event and each commutation sequence to provide optimum motor commutation for maximum power efficiency comprises the step of adjusting the delay to obtain minimum motor drive current.

15. The method of claim 12 further comprising the step of modifying the difference by a transfer function of F(s).

16. The method of claim 15 wherein said step of modifying the difference by a transfer function of F(s) comprises integrating the difference.

17. The method of claim 16 further comprising the step of providing a microcontroller and digitally implementing at least said automatic adjusting a delay step, and said transfer functions F(s).

* * * * *